United States Patent [19]

Tousignant et al.

[11] Patent Number: 4,997,284

[45] Date of Patent: Mar. 5, 1991

[54] CONCRETE AND MORSTAR DISTRIBUTION PROCESS AND APPARATUS

[75] Inventors: Robert C. Tousignant; James W. Tousignant; Richard L. Tousignant, all of St. Paul, Minn.

[73] Assignee: E-Con Mega Mix, St. Paul, Minn.

[21] Appl. No.: 545,407

[22] Filed: Jun. 28, 1990

Related U.S. Application Data

[62] Division of Ser. No. 285,126, Dec. 16, 1988, Pat. No. 4,953,752.

[51] Int. Cl.⁵ .......................... B28C 7/04; B01F 15/02
[52] U.S. Cl. ........................................... 366/8; 366/14; 366/16; 366/40; 366/42
[58] Field of Search .................. 366/2, 6, 8, 14, 15, 366/16, 18, 19, 21, 26, 40, 42, 192, 150; 222/185, 133, 196; 414/304

[56] References Cited

U.S. PATENT DOCUMENTS

| | | | |
|---|---|---|---|
| 2,299,702 | 10/1942 | Mosel | 222/612 |
| 3,018,880 | 1/1962 | Brugmann | 366/19 |
| 3,086,755 | 4/1963 | Kacena | 366/14 |
| 3,658,211 | 4/1972 | Kitchens | 222/185 |
| 3,985,244 | 10/1976 | Gessler | 414/304 |
| 4,792,234 | 12/1988 | Doherty | 366/14 |

FOREIGN PATENT DOCUMENTS 1269051 5/1968 Fed. Rep. of Germany.

Primary Examiner—Robert W. Jenkins
Attorney, Agent, or Firm—Anthony G. Eggink

[57] ABSTRACT

Process and apparatus are provided to distribute specified, premixed quantities of dry mortar mix and cement to a construction site. Bulk bags and a hopper apparatus are transported to the construction site and utilized with a forklift and a mixer device. The hopper apparatus is adjustably assembled and is constructed and arranged to be hand operable to efficiently meter homogeneous predetermined quantities of the mixture out of a discharge chute. The premixed contents in the bulk bags are dumped into the hopper apparatus and discharged in metered quantities into the mixer device. A water dispensing structure is provided to discharge a predetermined volume into the mixer device to form mortar or concrete for use.

9 Claims, 11 Drawing Sheets

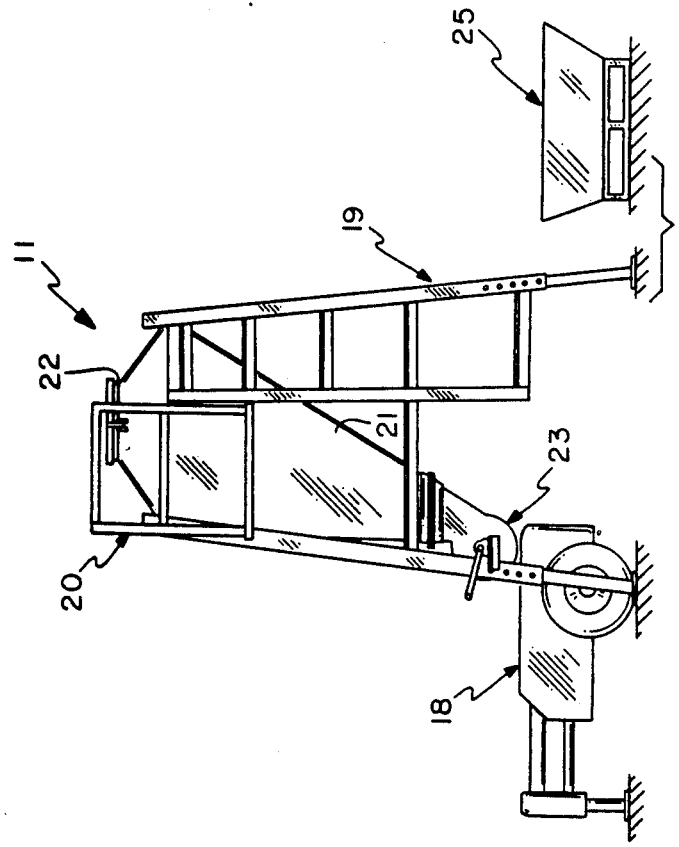
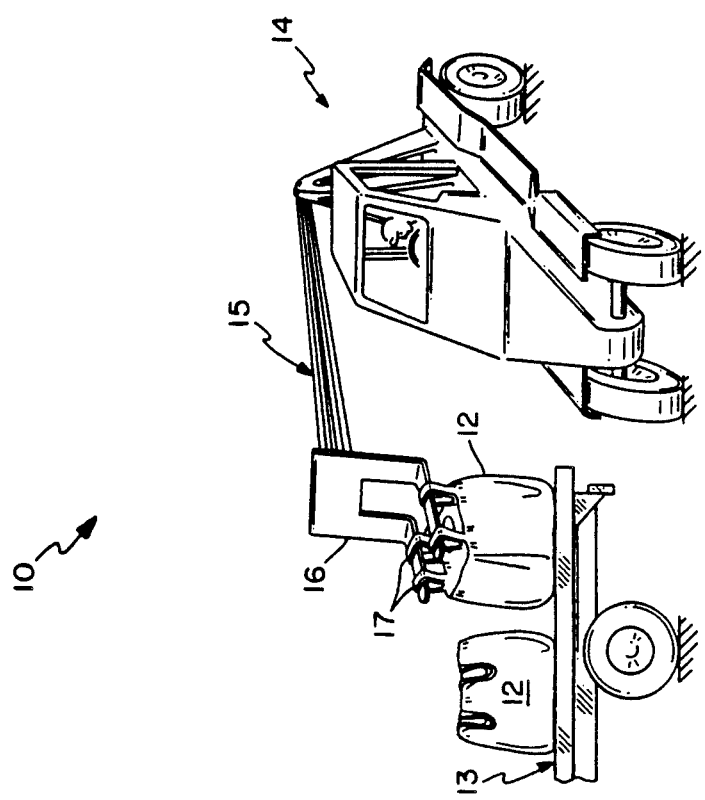
FIG. 1b.
FIG. 1a.

CONCRETE AND MORSTAR DISTRIBUTION PROCESS AND APPARATUS

This is a division of application Ser. No. 07/285,126, filed 16 Dec. 1988, now U.S. Pat. No. 4,952,752.

BACKGROUND OF THE INVENTION

This invention relates generally to the construction industry and, particularly, to the distribution of mortar and cement from a central batching plant to a construction site for various masonry purposes. This invention relates to processes and apparatus to distribute specified, premixed quantities of dry mortar mix and cement to a construction site where the premixed quantities are further handled and processed to efficiently yield mortar or concrete to a contractor in a cost effective manner.

The construction industry, one of the largest in the U.S., has relatively been technologically stable in work procedure and has long standing traditions. In the masonry segment of the industry, for example, cement and sand are still commonly hand shoveled into a cement mixer on the construction site. This practice is time consuming and obviously lacks quality assurance.

However, technological and aesthetic advances in mortar and concrete compositions are continually made. Engineers, architects, and building contractors today specify numerous masonry mortar and concrete performance requirements and designs.

Large quantities of mortar and concrete can be commercially mixed and delivered, ready for use, to a construction site by truck. Optionally, silos filled with sand and dry mortar or cement can be brought and installed at a construction site to automatically provide the contractor with mortar or concrete. For small quantities, premixed concrete containing Portland cement, sand and aggregate or dry mixed mortar can be commercially purchased in small bags and, subsequently, mixed with water at the job site. Although bags of premixed cement and mortar offer greater quality control, except for very small quantities, it is not cost effective. Additionally, the premixed ingredients are fixed in proportion and, thus, the resultant mortar and concrete mixture is predetermined in performance design.

Although various automated devices and processes have been utilized in the past to provide mortar at a job site, they have primarily been restricted to large job requirements. For example, one such system utilizes compartmentalized silos which hold sand and cement, respectively, and which automatically mixes preset quantities with water to produce a constant flow of mortar. These silos are relatively large, require electrical power and a constant source of water.

Similar mixing devices have also been utilized which also mix the ingredients at the job site to provide masonry mortar, plaster or concrete. These devices, although smaller in size, also require electrical power and water to provide a source of mixed product.

Unlike these relatively complex prior art devices, the process and apparatus of the present invention permits dry mortar, cement and other specified ingredients to be premixed at a commercial facility where the various ingredients or components can be economically blended with quality assurance. The invention also permits a contractor to utilize existing equipment, such as the cement mixer and fork lift. Additionally, the lack of electrical power and a constant water supply is not necessarily required to practice the invention. The process and apparatus provides the contractor with means to lower production cost and to increase mason productivity and quality control.

The process and apparatus of this invention overcomes the requirements and complexity of the prior art devices and provides a contractor the ability to mix high quality mortar and cement of any specified design at the job site in an economical manner which, heretofore, as far as is known, has not been proposed or developed.

SUMMARY OF THE INVENTION

This invention provides processes and apparatus to distribute specified, premixed quantities of dry mortar mix and cement to a construction site. The cement or mortar is premixed at a central processing facility according to specifications and requirements of the architect, structural engineer, or contractor. Predetermined quantities of the mixture are packaged in bulk bags and placed on a flatbed truck along with a hopper apparatus for transport to the construction site.

The hopper apparatus provided is for dispensing predetermined quantities of premixed materials. The apparatus includes a body structure having a side wall structure, a bottom and a top portion, having an openable and sealable inlet port. The side wall structure has a sloped configuration of a predetermined angle of repose. A discharge chute having metering means is mounted at the bottom portion of the body structure. The metering means is constructed and arranged to provide predetermined output of mixture. Adjustable leg structures are mounted to the body structure for the adjustable placement and alignment of the apparatus on the job site and with the mixer device.

The hopper apparatus is further provided with water dispensing means to discharge a predetermined volume into the mixer device to form mortar or concrete for use by the contractor. Additionally provided are anti-segregation means mounted within the body structure and other cooperating structures which enhance the function and efficiency of the apparatus.

At the construction site, the bulk bags of mixture and the hopper apparatus are lifted from the flatbed truck by means of a forklift. The forklift, the mixer device, and the mortar tub are provided at the construction site by the contractor for use with the elements brought from the central processing facility.

The hopper apparatus is assembled and the leg structures are adjusted so that the apparatus is aligned for use with the mixer device. The bulk bag mixture is dumped into the hopper body structure and metered into the mixer device. A predetermined volume of water is then discharged into the mixer device to form mortar or concrete, which is then dumped into a portable container and transported for use at the construction site.

Further provided by this invention are various hopper apparatus designs and structures to dispense predetermined quantities of premixed materials in an efficient, cost effective and quality controlled manner.

These and other benefits of this invention will become clear from the following description by reference to the drawings.

BRIEF DESCRIPTION OF THE DRAWINGS

FIGS. 1a and 1b are views of a construction site and a hopper apparatus positioned for operation, respectively;

DESCRIPTION OF THE PREFERRED EMBODIMENTS

Figure 2:
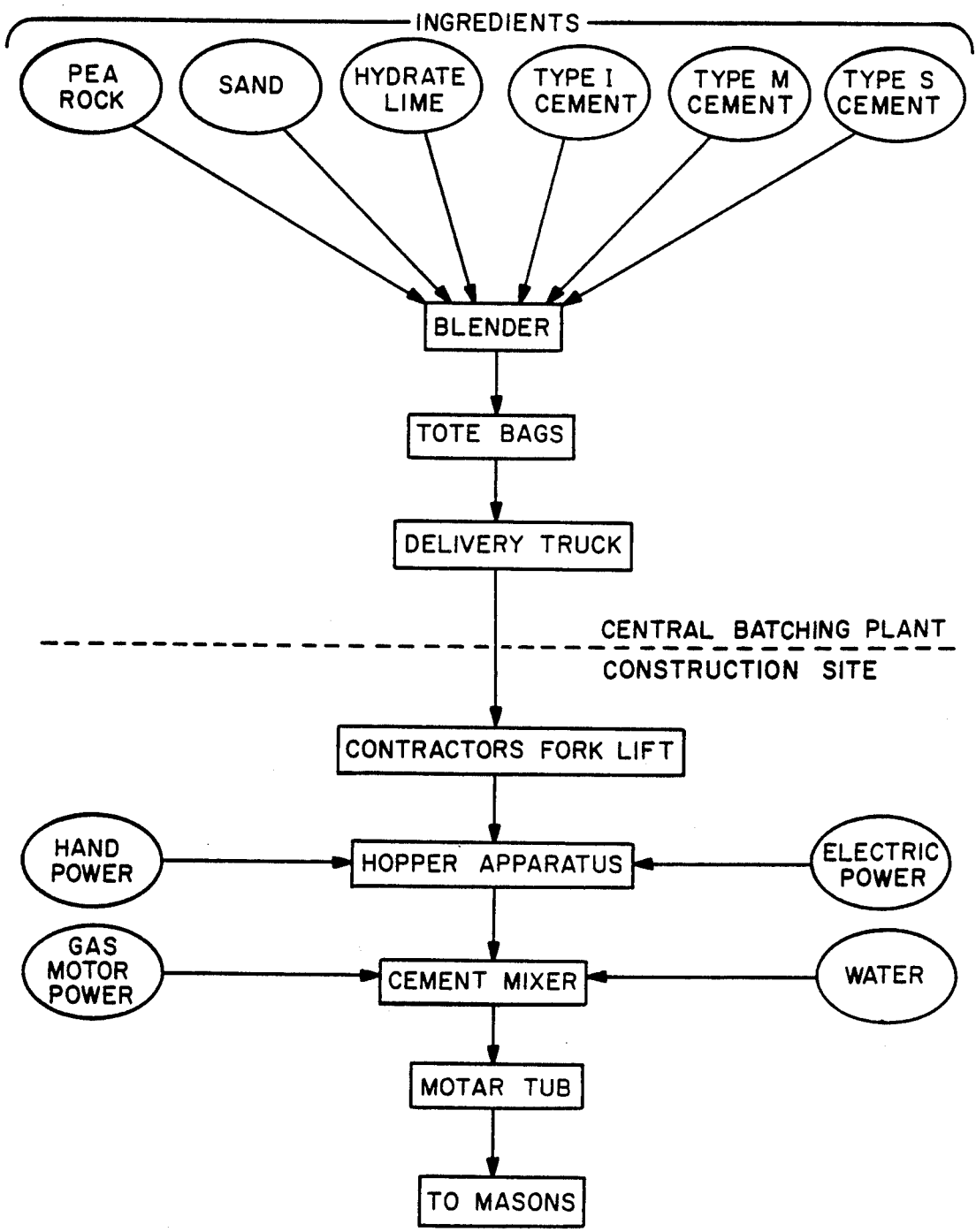
FIG. 2 is a flow diagram showing the process steps of this invention.

Referring to FIGS. 1a and 1b, a construction site 10 is thereshown. A flatbed truck or boom truck 13 is shown to have bulk tote bags 12 placed thereon. The flatbed truck is brought to the construction site 10 from a central batching plant where the tote bags are filled with formulated, premixed and predetermined quantities of cement or mortar mix. The bags are shown to have handles 17 which are engaged by the forks 26 of assembly 16 of the forklift 14.

A hopper apparatus 11 is initially also brought to the construction site 10 on the flatbed truck 13, and by means of the boom structure 15 of the forklift 14 the hopper apparatus 11 is lifted from the flatbed 13 and placed in position with respect to a mixer apparatus 18, such as a cement mixer. As will be further discussed, the hopper apparatus 11 is adjustably positioned and assembled to receive the premixed contents of the bulk bags 12.

A typical construction site usually has a forklift 14, a cement mixer 18, and a mortar tub 25 which represent standard equipment utilized by most contractors. Often the construction site does not have electrical power, nor a constant water supply. The process and apparatus of this invention are designed to be used in conjunction with these pre-existing elements and conditions. However, electrical power and a water supply may be used to enhance the functionality of this invention.

The hopper apparatus 11 is further shown to have a number of adjustable leg assemblies 19, a body structure 21 and a safety platform structure 20 which is comprised of steps 33, a standing platform 34 and safety rails 35. The leg assemblies 19 are adjusted so that the metering and dispensing structure 23 disposed at the bottom of the hopper 11 is positioned in height above the mixer 18.

As shown in FIG. 2, a flow diagram sets forth the various steps involved in the process of this invention. Initially, the tote bags 12 are filled with premixed quantities of specified dry cement or mortar mixtures at a central batching plant. The mixing components or ingredients shown at the central batching plant include pea rock (usually having an aggregate designation less than ⅜ of an inch in size), sand, hydrate lime, Type I cement, Type M cement and Type S cement. Other ingredients, such as color, can also be mixed into the blender to provide the predetermined mixture specified. The filled bags 12 are then placed along with the hopper apparatus 11 onto the bed of the truck 13. The flatbed or boom truck is then transported to the construction site 10 where the contractor has a cement mixer 18 and a forklift 14. The forklift 14 or the boom of truck 13 is then utilized to move the bags 12 so that they can be emptied into the body structure 21 of the hopper apparatus 11. The hopper apparatus 11 is assembled and arranged to allow predetermined metering of its contents into the cement mixer 18, wherein the quantities are mixed with water to form concrete or mortar. Ingredients, such as color, may also be mixed in at this stage. Thereafter, the mortar or concrete is emptied into a mortar tub 25 which is then positioned by means of the forklift 14 to the masons at the construction site for use.

Figure 3:
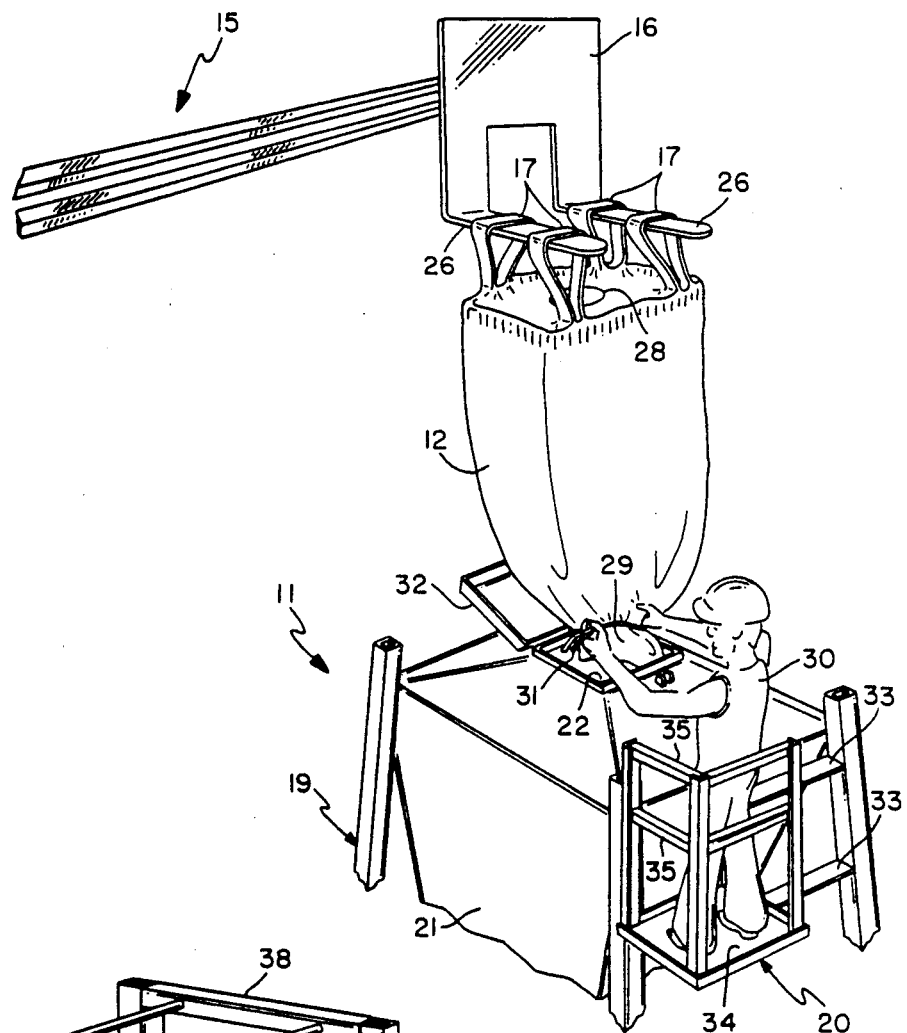
FIG. 3 is a perspective view showing a bulk bag positioned for emptying into the hopper apparatus of this invention.
Figure 5:
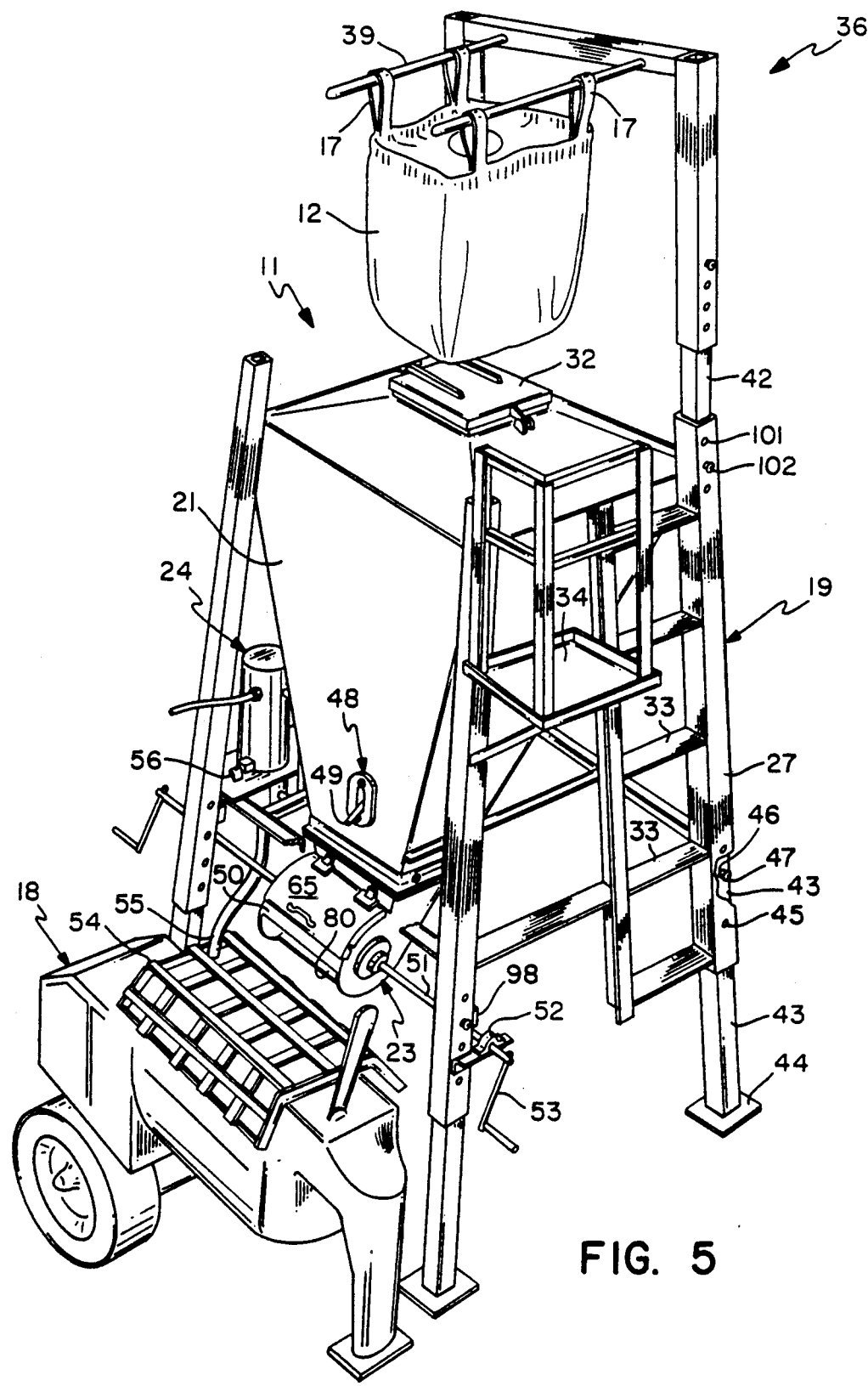
FIG. 5 is a perspective view showing an embodiment of the hopper apparatus of this invention positioned for use with a mixer device.

The bulk tote bags 12, as shown in FIGS. 1a, 3 and 5, have a pair of opposing handles 26, an inlet portion 28 and an outlet bottom end 29 which is secured by means of a drawstring 31, for example. The bulk bags 12 are filled at the central batching plant with specified, premixed quantities of dry mortar or cement mix. The bag structures 12 are preferably water-tight and hold approximately one cubic yard of mix, for example. The bulk bags 12 are preferably of a flexible, water resistant structure having a top inlet end 28 used for filling at the batching plant and a bottom outlet end 29 used for dumping the premixed contents into the apparatus 11. The bags preferably hold one cubic yard of mortar or cement mix and are about 32 inches long, wide and high in dimension. The outlet end 29 is preferably funnel shaped and about 18 inches long and 14 inches in diameter. However, other sized bulk bag structures could also be utilized to practice this invention.

Because of the advance in the mortar and concrete industry with respect to mortar and concrete performance designs, the mortar and cement is typically specified by the architect or engineer to yield specified performance standards or requirements.

Therefore, mortar and cement are typically mixed in various proportions at a central batching plant to yield resultant specifications that are difficult to attain at the job site utilizing a hand-filled cement mixer. Following are examples of masonry mix proportion specifications by weight:

TABLE I

Type "M" Masonry Mortar according to ASTM:C270; These proportions will meet strength requirements (2500 psi at 28 days) water retention (Min. 75%) and air content limitation (Max. 12%).

1. 1 part (94#) Northwestern States Type I Portland (ASTM:C150),
2. ¼ part (10#) Western Miracle Type "S" Lime (ASTM:207), and
3. 3¾ parts (300#) JL Shiely Company Masonry Sand (ASTM:C144).

Sufficient water should be added to produce the desired consistency for use.

TABLE II

Masonry Core Fill; 3000 psi @ 28 days;
1. 1 part (94#) Northwestern States Type I Portland (ASTM:C150), and 2. 4 parts (376#) Block Sand, JL Shiely Company, Fineness Modulus 3.90 (Approximate).

Sufficient water should be added to produce a 6" to 8" slump.

TABLE III

Type "S" Masonry Mortar; 1800 psi at 28 days, water retention (Min. 75%) and air content limitation (Max. 12%); ASTM:C270.

1. 1 part (94#) Northwestern States Type I Portland (ASTM:C150),
2. 1 part (40#) Western Miracle Type "S" Lime (ASTM:C207), and
3. 5 parts (400#) JL Shiely Company Masonry Sand (ASTM:C144).

Sufficient water should be added to produce the desired consistency for use.

TABLE IV

Type "N" Masonry Mortar; strength requirements (750 psi at 28 days), water retention (Min. 75%) and air content limitation (Max. 12%); ASTM:C270.

1. 1 part (94#) Northwestern States Type I Portland (ASTM:C150),
2. 1½ parts (60#) Western Miracle Type "S" Lime (ASTM:C207), and
3. 7 parts (560#) JL Shiely Company Masonry Sand (ASTM:C144).

Sufficient water should be added to produce the desired consistency for use.

The above mix proportions are merely exemplary to show the importance of premixing these products at a central batching plant where the various ingredients are readily available and where the dispensing, blending and filling equipment is set up to accurately fill the bulk bags 12.

As particularly shown in FIG. 3, the bulk tote bag 12 is positioned above the top of the hopper apparatus 11. The hopper apparatus 11 is equipped with a safety platform structure 20 which is further comprised of a number of steps 33 and a safety standing platform 34 from which a construction worker 30 is able to grasp the bottom of the tote bag 12 and to pull the drawstring 31 so that the contents of the tote bags 12 can be discharged through the outlet bottom 29 into the inlet hatch 22 of the hopper apparatus 11. As further shown, the hopper apparatus 11 has a hatch cover 32, which is a water-tight cover that is closed and locked upon completion of the content filling. The cover 32 protects the premixed contents from environmental elements.

Figure 4:
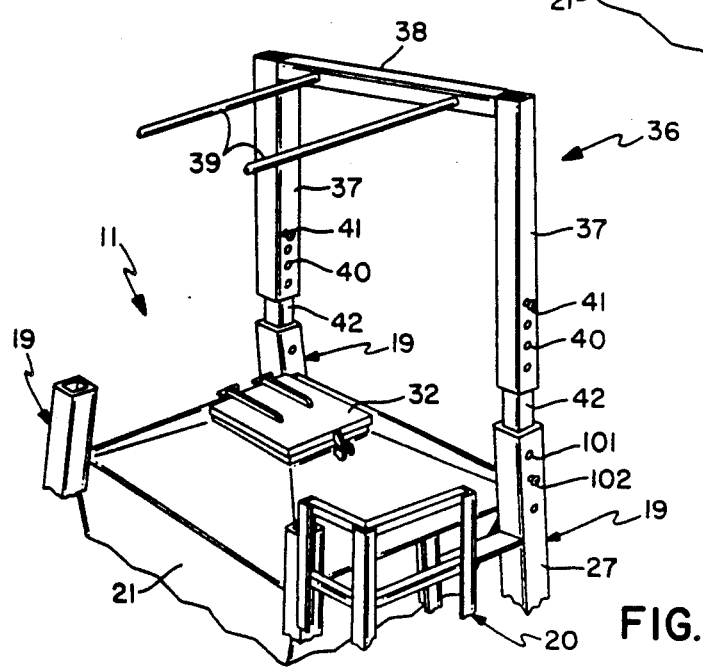
FIG. 4 is a perspective view showing a hopper apparatus having a bag hanging structure mounted at its top.

Referring to FIG. 4, the hopper apparatus 11 can be constructed in various sizes so that a predetermined number of tote bags can be emptied into its body structure 21. And, although a rectilinear hopper structure 11 is shown in the drawings, a round or circular structural hopper configuration is within the purview of this invention. For example, a body structure 21 having a volumetric capacity of 1.5–2 cubic yards has been found particularly useful. Thus, one or two tote bags 12 of mix can be emptied into the hopper body 21. As shown, a bag hanging structure 36 can be provided so that a tote bag 12 can be hung from the horizontal bag holder members 39 so that the bag can be emptied when required. As further shown in FIG. 5, the bag hanging structure 36 is comprised of upright members 37 which respectively have leg engaging members 42 that frictionally fit into the adjustable leg structures 19. The upright members 37 are fixed to cross bar member 38 from which the bag holder members 39 are fixed. Additionally, the leg engaging members 42 and the upright members 37 have adjusting apertures 40 which are constructed and arranged whereby locking pins 41 can be utilized to lock the members 37 which respect to the leg engaging members 42. The adjustability permits the use of various bag 12 structures and configurations.

The hopper apparatus 11 is preferably constructed and arranged to have the body structure 21 confined to a space of approximately 4'×4'×4'. Additionally, the leg structures 19 are preferably mounted to the body structure 21 in an outwardly angled configuration as shown in the drawings. The leg structures 19 are preferably adjustable so that the metering and dispensing structure can be positioned up to 4–6 feet from the ground. This construction will permit the apparatus to be used with most cement or mortar mixers 18.

As further shown in FIG. 5, the adjustable leg structures 19 are comprised of an outer adjustable leg member 27, an inner adjustable leg member 43 and a lower base pad member 44 for engaging the ground. The inner adjustable leg member 43 and the outer adjustable leg member 27 have aligning apertures 46 and 45, respectively, which can be locked with respect to each other by means of locking pins 47. This latter configuration permits the construction worker to position the hopper apparatus whereby the metering and dispensing structure 23 is positioned at a height to be usable with a particular mixer 18 configuration. The inner leg members 43 preferably are about 3"×3" and have a single aligning aperture 46 while the outer leg members 27 are about 3.5"×3.5" in dimension and have a plurality of apertures 45 spaced approximately six inches apart. The bag hanging structure 36 is similarly structured for adjustment and strength to cooperate with the leg structures 19.

As further shown, the hopper apparatus 11 has a hopper or bin level indicator 48 which is mounted to an exterior wall of the body structure 21. The hopper level indicator 48 has an indicator lever 49 which signals the construction worker as to the remaining quantity of mix in the body structure 21. When the indicator lever 49 shows a need further mixture, a bulk bag 12 is emptied into the body structure 21.

Importantly, the hopper apparatus 11 is constructed and arranged so that it is usable without electrical power. Thus, a particular metering and dispensing structure 50 is mounted to the bottom of the body structure 21. The structure 50 is comprised of a generally cylindrical body having a rotatable shaft 51 mounted therethrough. The rotating shaft 51 is supported by means of bearing or bushing structures 52 and has crank levers 53 at its ends which are hand rotatable by the construction worker. Each revolution of the rotating shaft 51 provides a predetermined quantity of mix from the body structure 21 into and through the grated top 54 of the mixer 18. For example, the output of one cubic foot of mix per revolution of the shaft 51 permits a construction worker to meter a specified quantity of product into the cement mixer 18. As shown here and in FIG. 8, a shaft revolution counter 98 is provided to show the number of revolutions of the shaft 51 and, thus, the number of cubic feet of mix dispensed.

Also shown is a water dispensing structure 24 which is mounted to the frame structure 100 of the hopper apparatus 11 and which is constructed and arranged to dispense predetermined quantities of water via the dispensing hose 55 into the mixer device 18. The predetermined volume of water is preset with respect to the desired specifications of the resultant mixture and is dispensed by the actuation of the operating lever 56 of the water dispensing structure 24.

A typical cement mixer 18 has a capacity to hold six cubic feet of mix and thus, six revolutions of the hand crank lever 53 with a preset volumetric discharge from the water dispensing structure 24 provides the contractor with a mixture that is controlled and reproducable.

Figure 6:
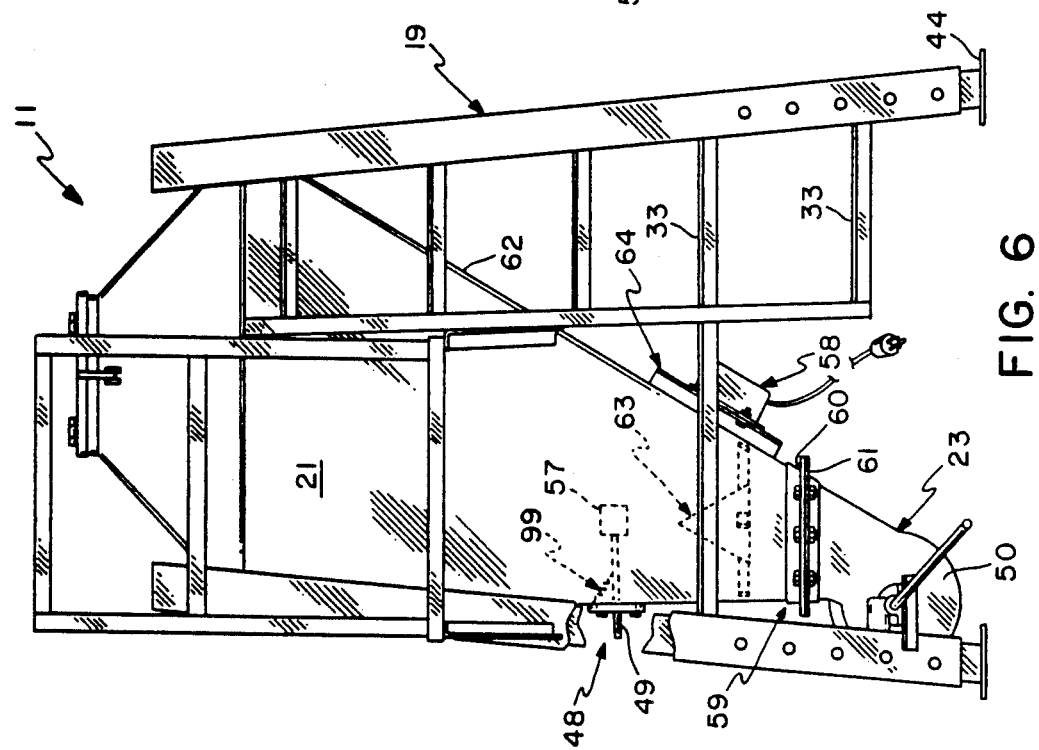
FIG. 6 is a lateral view showing another embodiment of the hopper apparatus.

As shown in FIG. 6, the hopper or bin level indicator 48 has a paddle structure 57 which is positioned in the interior of the body structure 21. Thus, when the level in the body structure 21 is above the paddle 57, the paddle is in a downward position, thus signaling the operator via the exterior indicator lever 49 that the contents are above that particular fill location. Once the mixture level falls below the paddle 57, biasing means 99 forces the paddle 57 in an upward position and thereby lowers the indicator lever 49 to signal the operator that the mix level is below that predetermined level. Other level indicators known in the art, for example, pneumatic or electric structures, may also be utilized in accordance with the invention.

Further shown in FIG. 6 is the configuration of the hopper apparatus 11 at its lower discharge end 59. Thereshown is a flanged mounting plate structure 60 to which the metering and dispensing structure 23 is mounted via its cooperating mounting plate structure 61. Further shown is the angular wall 62 of the body structure 21. As will be further described with respect to FIG. 10, the angular wall 62 has a predetermined slope or angle of repose so that the mix is efficiently discharged into the metering and dispensing structure 23. Optionally, to aid in this result, a vibrating structure 58 can be mounted via mounting structure 64 to the angular wall 62 to vibrate the wall and to cause the mix to slide into the lower discharge end 59. Further shown is an anti-segregation structure 63, which is constructed and arranged to provide a homogeneous mix of the mixture to the lower discharge end 59.

Figure 7:
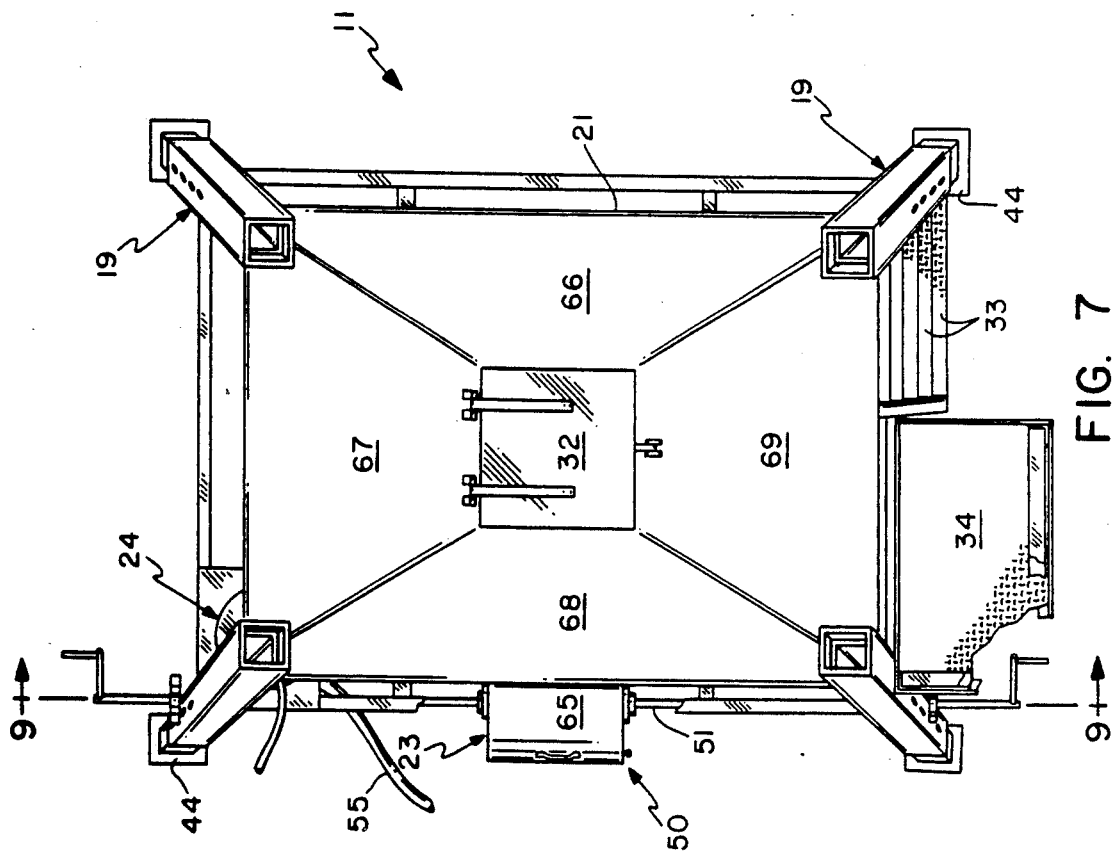
FIG. 7 is a top view of the hopper apparatus of FIG. 6.

FIG. 7 is a top view of the hopper apparatus 11 and which shows the top wall portions 66, 67, 68, and 69 of the body structure 21. Additionally, the leg structures 19 are shown to be angularly disposed with respect to the body structure 21, and the metering and dispensing structure 23 is shown to be positioned to the outside of the body structure 21 so as to be easily aligned and usable with the mixer device 18. It is an object of this invention to provide a hopper apparatus 11 which is adjustable and usable with a wide variety of pre-existing mixer devices 18 that may be found at a construction site. The body structure 21 is preferably constructed of 3/32 inch thick or 10 gauge mild steel. This construction permits minimal bracing and allows various elements to be mounted thereto. However, other structural materials and framing configurations can be used in accordance with this invention.

Figure 8:
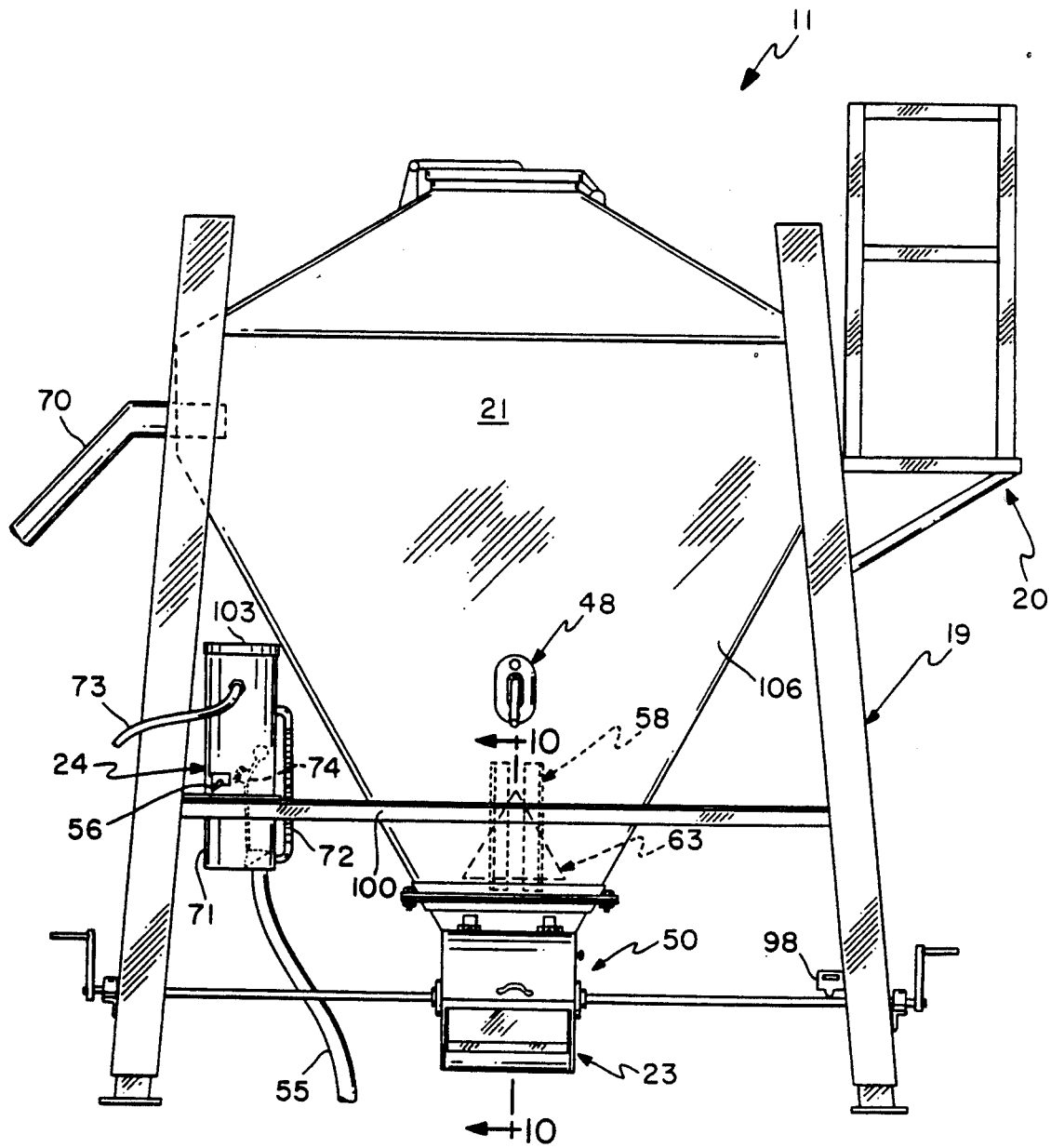
FIG. 8 is a frontal view of an embodiment of the hopper apparatus of this invention.

FIG. 8 further shows the structure of the water dispensing mechanism 24. The structure 24 has a tank structure 71, which holds approximately 15 gallons, a water inlet hose 73, an exterior level indicator 72, and a dispensing hose 55 (approximately 2 inches in diameter) which is used with the mixer 18. Optionally, water can be dumped through the top of tank 71 from a barrel at the job site. The interior of the tank structure 71 has an adjustable plunger mechanism 74 so that a preset or predetermined quantity or volume of water can be discharged by the activation of the operating lever 56. The plunger mechanism 74 shown is adjustable and can be similar to that utilized in toilet bowl structures. Further shown in FIG. 8, the body structure 21 has a pneumatic bulk infeed pipe 70 which may optionally be used to fill the body 21 with mortar or cement mixtures delivered by a pneumatic bulk truck.

Figure 9:
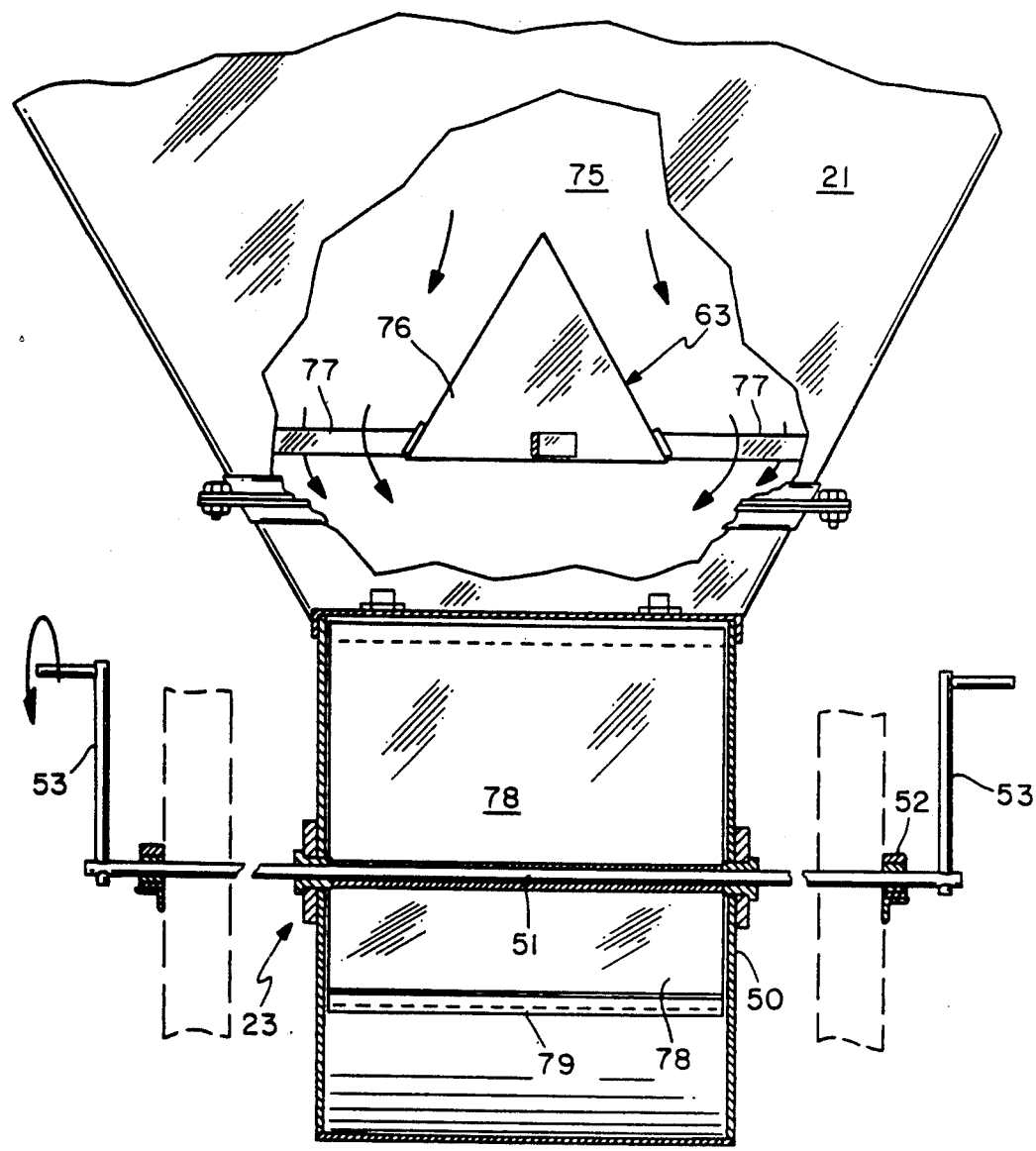
FIG. 9 is a sectional view of the hopper apparatus taken along lines 9—9 of FIG. 7.
Figure 10:
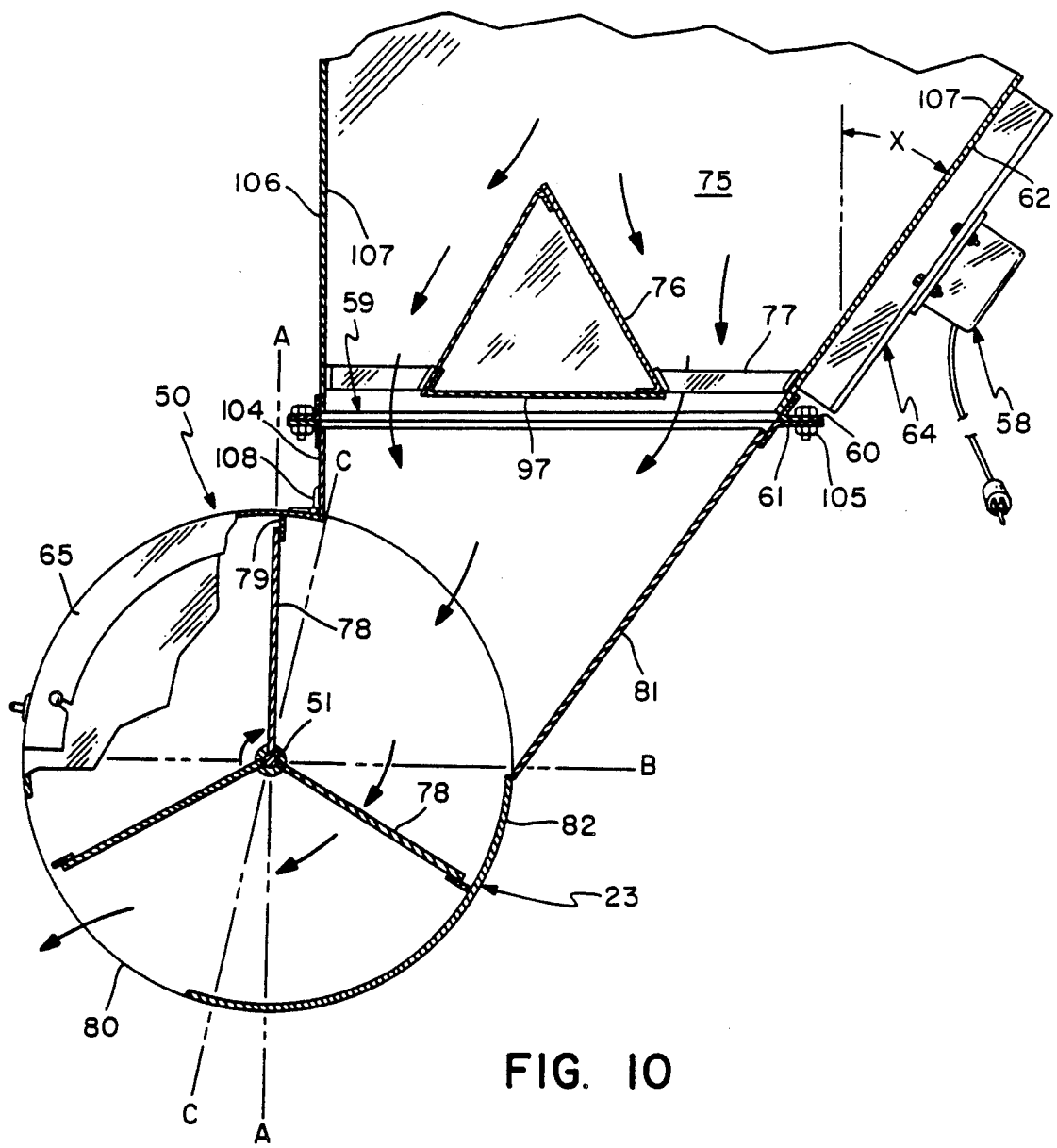
FIG. 10 is a sectional view of the hopper apparatus taken along lines 10—10 of FIG. 8.

FIGS. 9 and 10 further show the metering and dispensing structure 50 to have a number of rotating vanes 78 which are attached to the rotating shaft 51. Each rotating vane 78 has a tip end 79 mounted to the end thereof. Further shown is the anti-segregation structure 63 which is mounted to the interior of the body structure 21 by means of a support structure 77. This structure 63 is mounted over the discharge end of the body structure 21 so that the mixture 75 flows around the pyramidal structure 76 to thereby maintain a homogeneous consistency of the mixture 75. The pyramidal structure 76 has a bottom plate member 97 which is positioned over the bottom outlet or discharge end 59 of the hopper body 20. It has been found that a plate 97 alone having an area approximately 20% larger than the area of the discharge end 59 will function to prevent segregation or separation of the mix ingredients. Additionally, cone-shaped or round structures 63 may be utilized to ensure the discharge of a homogeneous mixture 75. The metering and dispensing structure 23 is shown to have three rotating vanes 78. Additionally, the hand operable dispensing structure 50 is shown to have a rounded bottom portion 82, a wall portion 81, a cover 65 with hinge structure 108, and an outlet portion 80 for the metered discharge of mixture 75.

As particularly shown in FIG. 10, the hand operable dispensing structure 50 is mounted to the discharge end mounting plate 60 by means of the cooperating mounting plate 61. Importantly, the dispensing structure 50 is shown to be disposed in a predetermined manner with respect to the discharge end 59. Particularly, reference lines A, B and C show that the structure 50 is positioned so as to meet the discharge end 59 at between approximately the one to three o'clock position and discharges the mixture between approximately the seven to nine o'clock position. Further, an angle "X" is shown with respect to the wall 62 of the body structure 21. It has been found that an angle of repose of 40-75 degrees, and preferably above 50 degrees, permits a constant unobstructed flow of product mixture to the discharge end 59 and into the metering and dispensing structure 23. Thus, a lateral wall structure portion having this angle of repose ensures that all of the mix 75 empties from the body structure into the dispensing structure 23. Although the hand operable dispensing structure 50 is here shown, other dispensing or metering structures, known in the art, can be mounted to the mounting plate 60 of the discharge end 59 in accordance with the teachings of this invention. These structures are individually suited for metering or dispensing different combinations or mixes of cement or mortar ingredients.

Figures 11, 12:
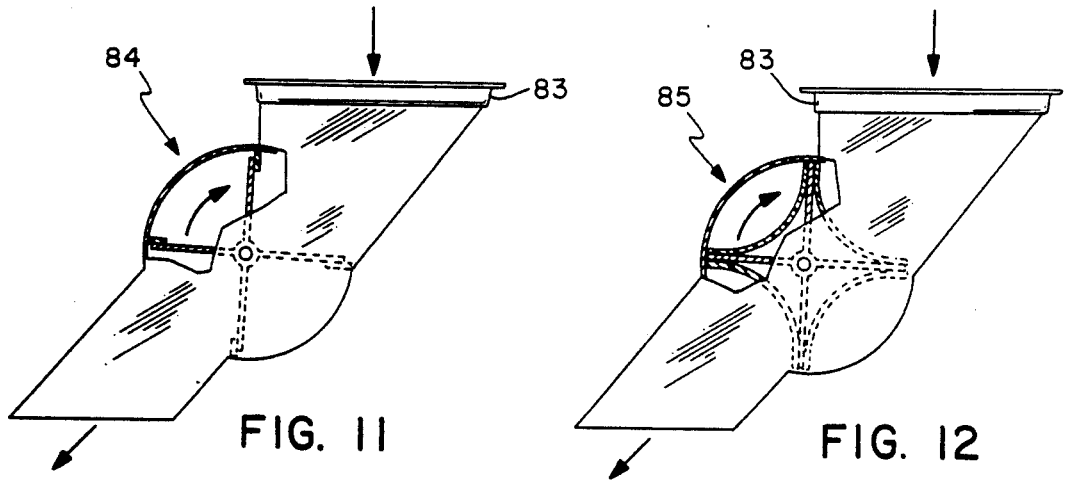
FIGS. 11-23 are lateral views of various discharge and metering structures usable with the hopper apparatus of this invention.

FIG. 11 shows a rotary feeder 84 having four vanes and which has a mounting structure 83 which mates with the mounting plate 60 of the body structure 21. FIG. 12 shows a rotary feeder 85 which also has four vanes and which further has curved surfaces between each of the vanes. This structure also has a mounting plate structure 83 to matingly mount to the body structure 21. Both structures 84 and 85 are hand operable and may optionally have any number of vanes. However, the structure shown in FIG. 10 is well suited for the invention described herein.

Figures 13, 14:
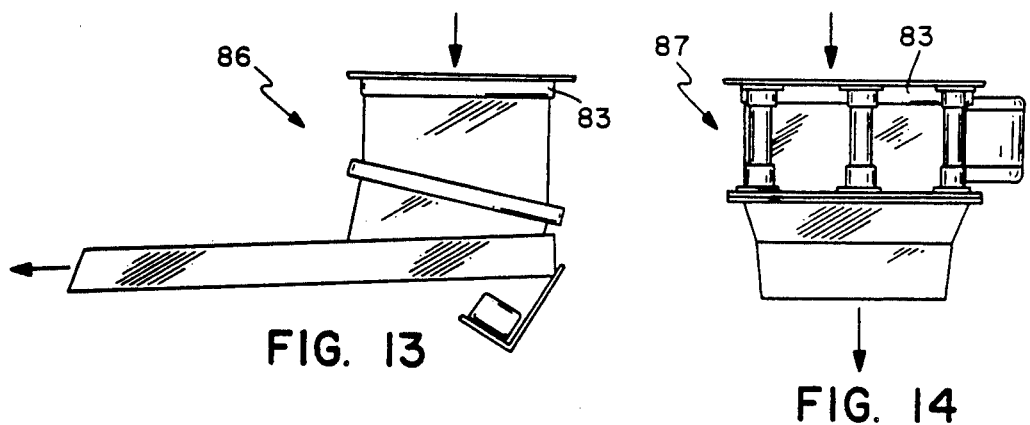
Figure 15:
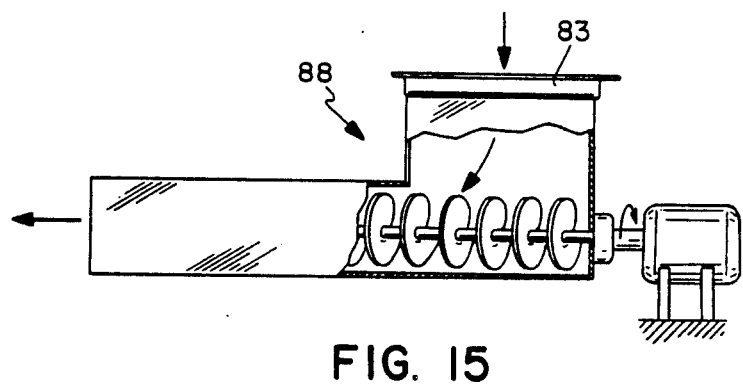

FIG. 13 shows a vibrating tray feeder 86 which also can be mounted to the mounting plate 60 of the body structure 21. FIG. 14 shows a gyrating bin discharge mechanism 87, and FIG. 15 shows an auger feeder 88 which utilizes a motor to feed mix to an outlet end. Although structures 86 and 87 require electrical power, structure 88 can be either hand operable or be electrically powered.

Figure 16:
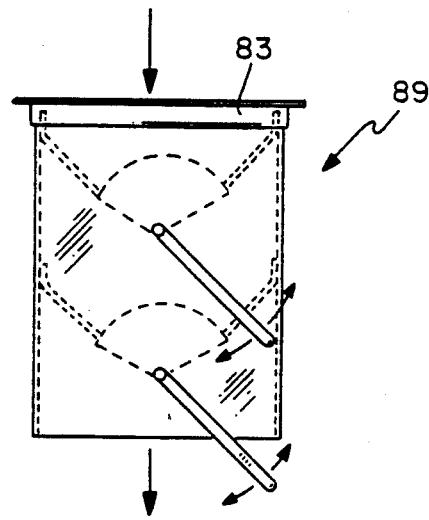
Figure 17:
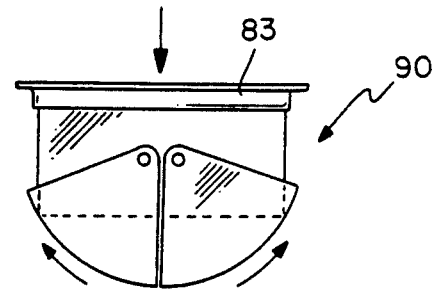
Figure 18:
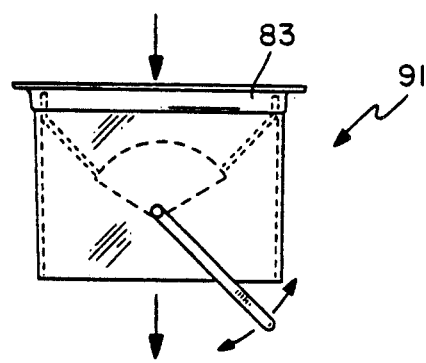
Figure 19:
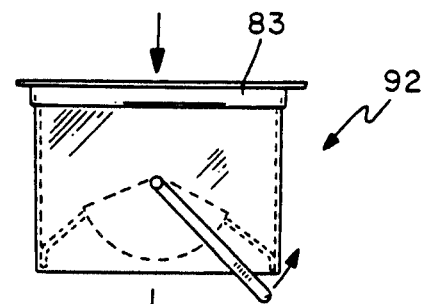

FIG. 16 shows a double clam meter 89 which has a pair of hand operable levers that are utilized to discharge mix from the body structure 21. Optionally, a pair of knife gates, as shown in structure 93 of FIG. 20, could be provided in structure 83 to obtain generally the same output effect. A double clam valve 90 in FIG. 17, which also can be utilized to discharge quantities of mix to the mixer device 18. FIG. 18 shows a single clam valve 91, while FIG. 19 shows an inverted single clam valve 92 which can also be utilized for this purpose. Structures 89–92 are all hand operable.

Figure 20:
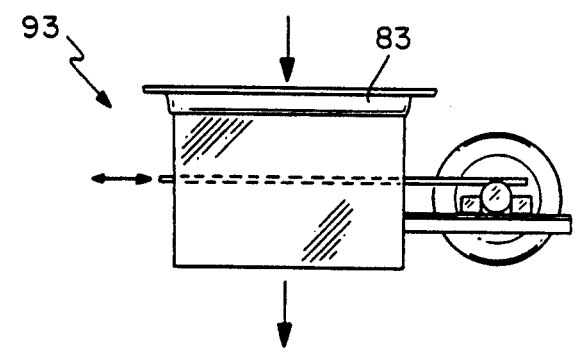
Figure 21:
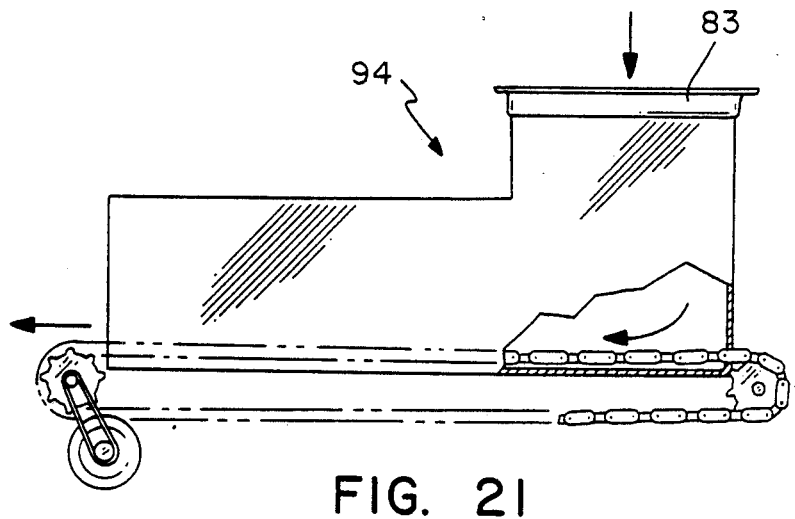
Figure 22:
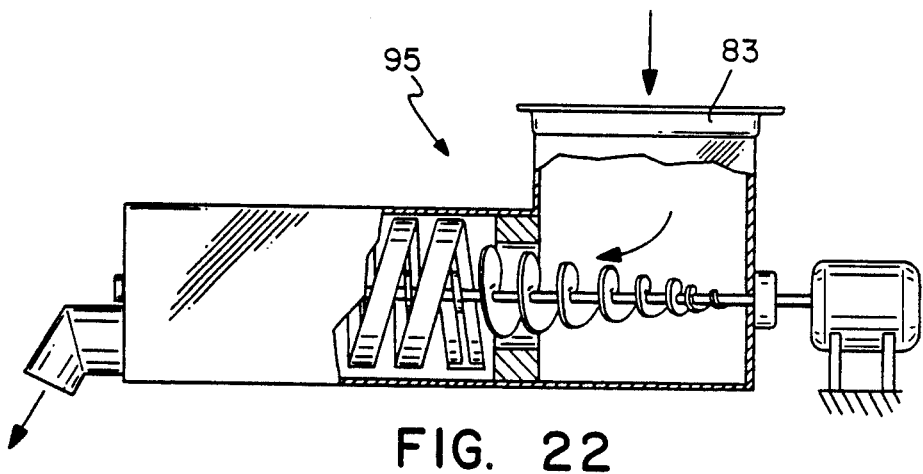
Figure 23:
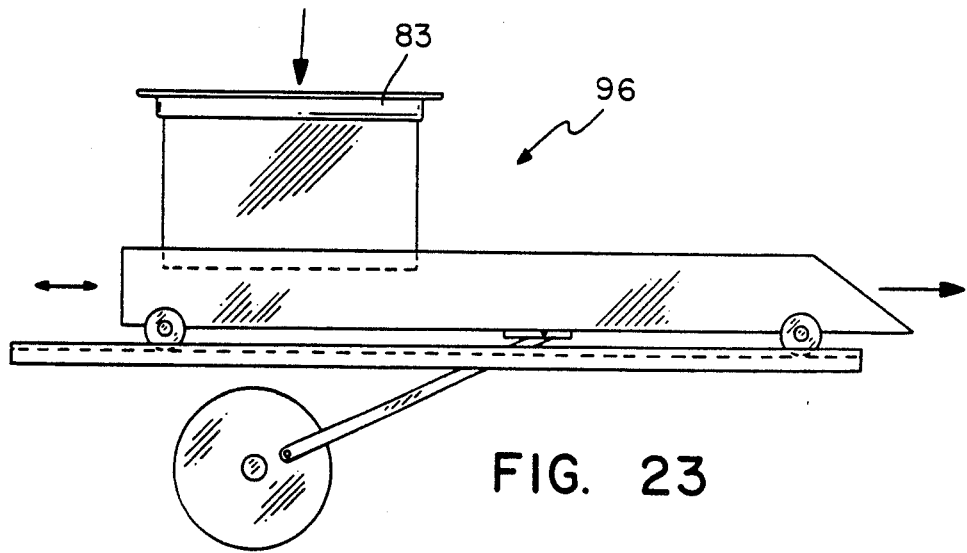

FIG. 20 shows a knife gate valve 93, while FIG. 21 shows a drag chain feeder structure 94, which may have an adjustable feed gate to control the product output rate. FIG. 22 shows a continuous feed mixing chamber 95 which also requires the use of an electric motor to feed the mix out of a discharge end. The tapered feed screw and choke section shown provides a consistent discharge into the mixing chamber. This homogeneous feed may also be obtained by utilizing a varying pitch feed screw. FIG. 23 shows a reciprocating plate feeder 96 which can also be attached via its mounting structure 83 to the discharge end of the body structure 20 of the hopper apparatus 11. Structure 96 may also be equipped with an adjustable gate to control the discharge feed rate. Although structures 93–96 are generally electrically powered, structure 93 may be hand operable.

The various metering or discharge structures shown in FIGS. 11–23 are generally known in the art, and they can all be utilized with the cooperating elements of the hopper apparatus 11 of this invention. However, as mentioned above, there is benefit that the discharge mechanism be of a hand operable configuration and capable of a metered outfeed. For example, in addition to hand operability and/or the use of a revolution counter 98, the contractor is able to monitor the exact quantity of mixture 75 discharge. Further, timers can be used in conjunction with the discharge structures shown in FIGS. 11–15 and 21–23 for repeatable product flow control.

As many changes are possible to the embodiments of this invention utilizing the teachings thereof, the descriptions above and the accompanying drawings should be interpreted in the illustrative and not the limited sense.

That which is claimed is:

1. A process for providing premixed mortar and cement at a construction site comprising:
   a. mixing predetermined ratios of ingredients at a central processing facility to form a specified mixture;
   b. filling predetermined quantities of the specified mixture into individual packaging structures at said processing facility;
   c. transporting the packaging structure to the construction site;
   d. providing a hopper apparatus for use with a mixer device, said hopper apparatus having inlet means and means to meter predetermined quantities of mixture to the mixer device;
   e. discharging the packaged mixture into the hopper apparatus and dispensing a predetermined quantity of the specified mixture into the mixer device;
   f. mixing said specified mixture quantity with a predetermined quantity of water to form mortar or concrete; and
   g. dumping said mortar or concrete into a portable open container for use at the construction site.

2. The process of claim 1, wherein said hopper apparatus provided in step (d) is further comprised of a water dispensing means and wherein said predetermined quantity of water in mixing step (f) is obtained from said hopper apparatus water dispensing means.

3. The process of claim 1, wherein step (a) includes the mixing of cement, sand, and at least one other ingredient.

4. The process of claim 1, wherein the packaging structures provided in step (b) are flexible water resistant bags having handle portions and further being of a size to hold approximately one cubic yard of mixture.

5. The process of claim 1, wherein a flat-bed or boom delivery truck provides the transportation of the packaging structure to the construction site.

6. The process of claim 5, wherein said hopper apparatus is also transported on the delivery truck from the central processing facility to the construction site.

7. The process of claim 1, wherein said process steps include the use of a fork lift or boom truck to move the bags of mixture to said hopper apparatus.

8. The process of claim 1, wherein said hopper apparatus provided includes a hand operable and rotatable crank structure, and wherein approximately one cubic foot of mixture is provided per hand crank rotation.

9. The process of claim 1, wherein said hopper apparatus includes adjustable leg structures for adjustably positioning said apparatus for communicative use with the mixer device.

* * * * *